United States Patent
Liu et al.

(10) Patent No.: US 11,732,149 B2
(45) Date of Patent: *Aug. 22, 2023

(54) FORMULATION COMPOSITION FOR 3D ADDITIVE MANUFACTURING AND PROCESSING METHOD OF THE SAME

(71) Applicant: Vista Applied Materials, Inc., Linbian Township, Pingtung County (TW)

(72) Inventors: Wen-Feng Liu, Linbian Township, Pingtung County (TW); Wan-Sen Lu, Linbian Township, Pingtung County (TW)

(73) Assignee: VISTA APPLIED MATERIALS, INC., Linbian Township (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,985

(22) Filed: Jun. 15, 2022

(65) Prior Publication Data

US 2022/0306878 A1      Sep. 29, 2022

Related U.S. Application Data

(63) Continuation of application No. 17/029,568, filed on Sep. 23, 2020, now Pat. No. 11,472,975, which is a continuation-in-part of application No. 16/595,328, filed on Oct. 7, 2019, now Pat. No. 10,822,464.

(30) Foreign Application Priority Data

Oct. 8, 2018   (TW) ................. 107135457

(51) Int. Cl.
| C09D 11/101 | (2014.01) |
| C09D 11/102 | (2014.01) |
| B33Y 70/00  | (2020.01) |
| C09D 11/037 | (2014.01) |
| C09D 11/107 | (2014.01) |
| C09D 11/38  | (2014.01) |

(52) U.S. Cl.
CPC ............ *C09D 11/101* (2013.01); *B33Y 70/00* (2014.12); *C09D 11/037* (2013.01); *C09D 11/102* (2013.01); *C09D 11/107* (2013.01); *C09D 11/38* (2013.01)

(58) Field of Classification Search
None
See application file for complete search history.

(56) References Cited

U.S. PATENT DOCUMENTS

| 2016/0136889 A1* | 5/2016 | Rolland ................. B33Y 80/00 |
| | | 264/1.27 |
| 2017/0008233 A1* | 1/2017 | Vontorcik, Jr. .... C08G 18/4277 |
| 2018/0009162 A1* | 1/2018 | Moore ................. B33Y 70/00 |
| 2018/0264719 A1* | 9/2018 | Rolland .............. A43B 13/181 |

FOREIGN PATENT DOCUMENTS

| CN | 106103527 A | 11/2016 |
| CN | 107438513 A | 12/2017 |
| TW | 201706324 A | 2/2017 |

* cited by examiner

*Primary Examiner* — Christopher M Rodd
(74) *Attorney, Agent, or Firm* — Schmeiser, Olsen & Watts LLP

(57) ABSTRACT

The present invention discloses a hybrid (mixed) formulation composition for 3D additive manufacturing and a manufacturing process. The hybrid formulation composition possesses capability of UV radiation curing and thermal curing. The hybrid formulation composition is designed to be cured by UV radiation in the 3D printing/additive manufacturing process and then post cure by heat to get its final properties. The hybrid formulation composition consists of acrylates (oligomer, monomer, and diluent), photoinitiators, and isocyanate-containing prepolymers which comprises polyols (di-ol, tri-ol) and isocyanates. The hybrid formulation composition may also include reaction accelerator, dye, pigment, and fillers. The finished products of the hybrid formulation composition possess rubber-like properties and can be used in the applications such as shoe sole, toys, medical, and wearables goods . . . etc.

4 Claims, 3 Drawing Sheets

FORMULATION COMPOSITION FOR 3D ADDITIVE MANUFACTURING AND PROCESSING METHOD OF THE SAME

CROSS REFERENCE TO RELATED APPLICATION[S]

This application is a continuation of U.S. patent application entitled "FORMULATION COMPOSITION FOR 3D ADDITIVE MANUFACTURING AND PROCESSING METHOD OF THE SAME," Ser. No. 17/029,568, filed on Sep. 23, 2020, which is a Continuation-in-Part of U.S. patent application entitled "FORMULATION COMPOSITION FOR 3D ADDITIVE MANUFACTURING AND PROCESSING METHOD OF THE SAME," Ser. No. 16/595,328, filed on Oct. 7, 2019, now U.S. Pat. No. 10,822,464, which claims priority to Taiwanese Patent Application No. 107135457 filed on Oct. 8, 2018, the disclosures of which are incorporated entirely herein by reference.

FIELD OF THE INVENTION

The present invention belongs to the field of polymer materials, and particularly relates to a combination of a heat curing and photocurable resin composition and a preparation method thereof, which can be used in the field of 3D additive printing.

BACKGROUND OF THE INVENTION

In conventional additive manufacturing or three-dimensional manufacturing techniques, three-dimensional (3D) structures are constructed in a stepwise or layer-by-layer manner. Layer formation is carried out by curing of a photocurable resin under the action of visible light or ultraviolet light irradiation. The past two techniques are known: a "top down" technique forms a new layer on the underside of a growing object; another "bottom up" technique is on the top of a growing object.

An early example of forming a new layer on the top surface of a growing article is shown in FIG. 3 of U.S. Pat. No. 5,236,637. One disadvantage of this "top down" technique is the need to immerse the growing object in a (possibly deep) pool of liquid resin and to reconstruct a precise liquid resin coating.

An early example of forming a new layer on the underside of a growing object is shown in FIG. 4 of U.S. Pat. No. 5,236,637. Although this "bottom up" technique has the potential to eliminate the need for deep wells in which objects are immersed by moving the object up from a relatively shallow well or pool, such as commercially implemented The problem with the "bottom-up" manufacturing technique is that when separating the solidified layer from the substrate, extreme mechanical care must be used and additional mechanical components must be used due to the physical and chemical interactions between them.

A continuous method of manufacturing 3D structures is presented quite thoroughly in the "top-down" technique in U.S. Pat. No. 7,892,474, but this reference does not explain how they can be used in a "bottom-up" system without destroying the prepared articles. The manner of implementation limits the materials that can be used in the method, thereby limiting the structural properties of the object thus produced. U.S. Patent Application Publication No. 2012/0251841 describes liquid radiation curable resins for additive manufacturing, but these contain cationic photoinitiators (thus limiting the materials available) and are only recommended for additive manufacturing.

The photosensitive resin for 3D additive printing needs to be quickly cured under the exposure conditions of the 3D printer and needs to meet the printing process of the printer and has certain fluidity. These are the basic requirements that photosensitive resins can be used in 3D printers. At present, the photosensitive resin used in 3D printers has a single variety, mainly high-hardness resins, but such resins have the disadvantages of insufficient toughness, poor impact resistance, and brittleness. The high toughness 3D printing photosensitive resin is new direction for printing materials 3D printing technology using photosensitive resin as printing material mainly includes: Stereo lithography (SLA), DLP projection digital light processing (DLP) and ultra-thin layer thickness photosensitive resin injection molding technology. The printing process is to establish the 3D model in the computer, and then deliver the 3D printer for printing. The printing process uses ultraviolet light to irradiate the liquid photosensitive resin and stack them layer by layer. The shortcomings of the photosensitive resin used in the stereolithography rapid prototyping 3D printer are obvious. Due to the use of the epoxy resin with good stability, the strength is high but very brittle, the printing model is easily broken, and it is easy to bend and break. Increasing toughness is a requirement for stereolithography rapid prototyping 3D printing photosensitive resin and blending with high toughness photosensitive resin is also a solution.

Accordingly, there is a need for a hybrid formulation composition for 3D additive manufacturing that can be used to produce 3D structures having satisfactory structural properties by additive manufacturing.

SUMMARY OF THE INVENTION

The main purpose of the invention is to provide a composition formula of a hybrid formulation composition for 3D additive manufacturing, which can combine ultraviolet curing and heat curing and can increase the toughness, resilience and tear resistance of the structural material after curing.

Another purpose of the present invention is to provide a process for the preparation of a mixed formulation composition for 3D additive production which does not require the use of a blocked isocyanate, thereby greatly reducing the curing temperature.

Another purpose of the present invention is to provide a process for using the hybrid formulation composition for 3D additive manufacturing, which requires only 2-3 seconds of curing, short process time, saves process energy and increases productivity, and can increase the toughness, resilience and tear resistance of the structural material after curing.

In order to achieve the primary purpose of the present invention, the present invention provides a mixed formulation composition for 3D additive manufacturing, which mainly comprises A prepolymer;
A photocurable material formulation, accounted for 30 to 70% by weight of the hybrid formulation composition;
Optionally, a polyol;
Optionally, at least one non-reactive light absorbing pigment, dye or photochromic material;
Optionally, at least one catalyst; and
Optionally, at least one filler;

wherein the prepolymer and the polyol, accounted for 30 to 70% by weight of the hybrid formulation composition; and wherein the prepolymer comprises a polyisocyanate oligomer produced by reacting at least one isocyanate (NCO) with at least one polyol, and the ratio of the isocyanate to the polyol (NCO/OH) is greater than one.

According to a feature of the invention, the prepolymer containing reactive isocyanate is a compound of T-R-T, R is a polymer of a polyol, each T is a terminal group of R, and T is a reactive isocyanate (NCO).

According to one feature of the invention, R in the prepolymer is more reactive end groups.

According to a feature of the invention, the prepolymer comprises a polyisocyanate oligomer produced by first reacting at least one isocyanate with at least one polyol, and the ratio of the isocyanate to the polyol (NCO/OH) is greater than one.

In order to achieve the secondary purpose of the present invention, the present invention provides a mixed formulation composition for 3D additive manufacturing, which mainly comprises Preparing a prepolymer containing reactive isocyanate;
Preparing a photocurable material formulation;
Mixing the prepolymer with the photocurable material formulation;
Optionally, mixing a polyol, at least one non-reactive light absorbing pigment, a dye or photochromic material, at least one catalyst and at least one filler;
A photocurable material formulation accounts for 30 to 70% by weight of the hybrid formulation composition
The prepolymer and the polyol account for 30 to 70% by weight of the hybrid formulation composition.
The photocurable material comprises at least: an acrylic series oligomer, an acrylic series monomer, and at least a photoinitiator.

According to one feature of the invention, the acrylic series of oligomers is selected from one of the following: epoxy acrylate (EA), polyurethane acrylate (PUA), polyester acrylate (PEA), epoxy resin, unsaturated polyester, polyether acrylate, and acrylated polyacrylic resin.

According to a feature of the invention, the acrylic series monomer is selected from one of the following groups: (meth)acrylate group, vinyl group, vinyl ether group, epoxy group.

According to a feature of the invention, the pigment, dye or photochromic material comprises up to 12% by weight of the hybrid formulation composition, and the pigment, dye or photochromic material is selected from the group consisting of organic and inorganic pigments and dyes, titanium dioxide or carbon black.

According to a feature of the invention, the catalyst comprises up to 2% by weight of the mixed formulation composition, and the catalyst is selected from the group consisting of amine catalysts and metal catalysts.

In order to achieve the secondary purpose of the present invention, the present invention provides a 3D structure process method comprising the following steps Print a 3D structure in a 3D printer using a hybrid formulation composition;
During the layered printing process, a UV light is applied;
After stopping the layered printing process, a heating process is performed;
Wherein, the hybrid formulation composition mainly comprises
A prepolymer;
A photocurable material formulation, accounted for 30 to 70% by weight of the hybrid formulation composition;
A polyol;
Optionally, at least one non-reactive light absorbing pigment, dye or photochromic material;
Optionally, at least one catalyst; and
Optionally, at least one filler;
wherein the prepolymer and the polyol, accounted for 30 to 70% by weight of the hybrid formulation composition; and
wherein the prepolymer comprises a polyisocyanate oligomer produced by reacting at least one isocyanate (NCO) with at least one polyol, and the ratio of the isocyanate to the polyol (NCO/OH) is greater than one.

According to a feature of the invention, the UV light has a wavelength between 240 nanometers (nm) and 450 nanometers (nm).

According to a feature of the invention, the UV light has an intensity of between 0.1 J/cm2 and 1 J/cm2.

According to a feature of the invention, the irradiation time of the UV light is between 0.5 seconds and 90 seconds.

According to a feature of the invention, the temperature of the heating process is between 50° C. and 150° C.

According to a feature of the invention, the heating process is between 30 minutes and 16 hours.

The ratio of the isocyanate to the polyol (NCO/OH) of the hybrid formulation composition for the 3D additive manufacturing of the present invention is greater than 1. (i.e. isocyanates are not blocked). The invention has the following effects 1. The toughness, resilience and tear resistance of the hybrid formulation composition for 3D additive manufacturing can be adjusted according to requirements, and it is free of volatile substances, and is an environmentally friendly material.
2. The hybrid formulation composition for 3D additive manufacturing has rubber-like properties, which can increase the toughness, resilience and tear resistance of the structural material after curing, and can be used for shoe materials, toys, biomedical equipment, and wearable articles.
3. The process of the hybrid formulation composition for 3D additive manufacturing requires only 2-3 seconds of photocuring, low heat curing temperature, short process time, saving process energy and increasing productivity.

BRIEF DESCRIPTION OF THE DRAWINGS

The above and other purpose, features and advantages of the present invention will become more apparent and understood.

DESCRIPTION OF THE PREFERRED EMBODIMENTS

Figure 1:
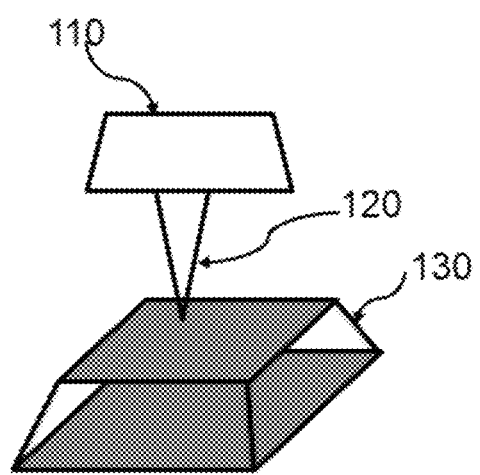
FIG. 1 is a schematic view showing the process of a hybrid formulation composition for 3D additive manufacturing of the present invention.

While the invention may be embodied in a variety of forms, the embodiments shown in the drawings and illustrated herein are the preferred embodiments of the invention. Those skilled in the art will appreciate that the devices and methods specifically described herein and illustrated in the drawings are considered as an example of the invention, non-limiting exemplary embodiments, and the scope of the invention defined. Features illustrated or described in connection with an exemplary embodiment may be combined with features of other embodiments. Such modifications and variations are intended to be included within the scope of the invention.

Referring to FIG. 1, there is shown a process schematic diagram of a mixed formulation composition for 3D additive manufacturing of the present invention. The present invention provides a mixed formulation composition for 3D additive manufacturing for preparing various 3D structures comprising polyurethane, polyurea, acrylic or copolymers thereof. It utilizes a 3D printer 110 to convert a hybrid formulation composition 120 onto a 3D structure 130 and cure the mixed composition during the forming process by irradiation of ultraviolet (UV) light. After the 3D structure 130 is formed, a thermal curing process can be performed. The hybrid formulation composition can simultaneously increase the toughness, resilience and tear resistance of the structural material after curing by ultraviolet curing and heat curing and is therefore referred to as a hybrid formulation composition. In the present invention, the amount of each component is based on the weight percentage of the entire composition, that is, in weight %. Also, the term "optionally" refers to a component that can be preferably selected, not necessarily.

The mixed composition 120, which mainly comprises

A prepolymer;

a photocurable material formulation, accounted for 30 to 70% by weight of the hybrid formulation composition;

a polyol;

optionally, at least one non-reactive light absorbing pigment, dye or photochromic material;

optionally, at least one catalyst; and optionally, at least one filler;

wherein the prepolymer and the polyol, accounted for 30 to 70% by weight of the hybrid formulation composition; and wherein the prepolymer comprises a polyisocyanate oligomer produced by reacting at least one isocyanate (NCO) with at least one polyol, and the ratio of the isocyanate to the polyol (NCO/OH) is greater than one.

The prepolymer containing a reactive diisocyanate is a compound of the formula T-R-T, and each T is a terminal group of R; wherein T is a reactive isocyanate (NCO). R of the prepolymer further comprises a reactive end group, or R of the prepolymer does not comprise a reactive end group. In one embodiment, R is a network structure of a urethane polymer.

Isocyanate (NCO) has high reactivity, especially aromatic isocyanate (NCO), so special attention should be paid to storage and processing applications. The Mole ratio should be adjusted appropriately in accordance with moisture and temperature. Occasionally, the reaction between isocyanates and polyols has been counteracted by blocking the isocyanate group, preventing this reaction from occurring at room temperature. Normally the reaction with blocking is to be initiated at high temperature. In the coatings industry, blocked isocyanates are one of the most effective ingredients in the formulation. These blocking agents are usually based on methylethylketoxime, caprolactum and ethyl malonate.

In one embodiment, the prepolymer is made by a polyisocyanate oligomer, a diisocyanate and/or a chain extender with an amine methacrylate, an alcohol methacrylate, a maleic acid ester as a diisocyanate and/or a chain extender. The isocyanate is blocked by reacting it with imine or N-vinyl formamide monomer blocking agent.

In the present invention, isocyanate (NCO) is not blocked. The end groups of the prepolymer may optionally comprise at least one single or multiple ethylenic unsaturated end groups. The prepolymer comprises a polyisocyanate oligomer produced by reacting at least one isocyanate, with at least one polyol, and the ratio of the isocyanate to the polyol (NCO/OH) is greater than 1.

These isocyanates are usually di- or tri-functional, with polyhydroxy compounds (polyols that are normally-OH terminated polyesters polyether or acrylics), a urethane polymer network structure is formed in the presence of a suitable catalyst (usually in the presence of a tin complex). The catalyst promotes the formation of a urethane polymer network structure.

The photocurable material comprises at least: an acrylic series oligomer, an acrylic series monomer, and at least one photoinitiator. The photocurable material prefers 45 to 60% by weight of the mixed formulation composition The acrylic series oligomer is selected from one of the following combinations: epoxy acrylate (EA), polyurethane acrylate (PUA), polyester acrylate (PEA), epoxy resin, unsaturated polyester, polyether acrylate, and acrylate. The acrylic series oligomer content could be up to 60% by weight based on the total weight of the photocurable material; more preferably, the acrylic series oligomer content is from 15 to 40 wt % of the total weight of the photocurable material.

The acrylic series monomer is selected from one of the following combinations: (meth) acrylate oxime, vinyl oxime, vinyl ether oxime, epoxy oxime. The acrylic series is selected from one of the following combinations: Trimethylopropane Formal Acrylate (CTFA), hydroxyethyl methacrylate (HEMA), β-carboxyethyl acrylates (β-CEA), Isobornyl Acrylate (IBOA), 2-phenoxyethyl acrylate Ester (PHEA), 1,6-hexanediol diacrylate (HDDA), dipropylene glycol diacrylate (DPGDA), tripropylene glycol diacrylate (TPGDA), trimethylol propane triacrylate (TMPTA), ethoxylated trimethylolpropane triacrylate [TMP(EO)TA], pentaerythritol tetraacrylate (PETTA), Trimethylolpropane tetraacrylate (DTEMPTTA), dipentaerythritol pentaacrylate (DPEPA), dipentaerythritol hexaacrylate, (DPHA), 2-Phenoxy Ethyl Acrylate (PHEA), Ortho-Phenyl Phenoxy Ethyl Acrylate (OPPEA), Benzyl Mathacrylate (BMA), 2-Phenoxy Ethyl Mehacrylate (PHEMA), N, N-Dimethyl acrylamide (DMAA), Acryloyl morpholine (ACMO), N, N-Diethyl acrylamide (DEAA) and its ethoxylation product. The acrylic series monomer content is 30-90% by weight based on the total weight of the photocurable material. The acrylic series monomer is characterized by a benzene ring or an amide (Amide) type amide, which can make the photocurable material have better solubility; preferably, the acrylic monomer content is 30-70% by weight of the total amount of the photocurable material formulation, more preferably, the acrylic monomer content is 45-55 wt % of the total weight of the photocurable material formulation.

The photoinitiator is 1-Hydroxy-cyclohexyl-phenyl-ketone (184), Diphenyl (2,4,6-trimethylbenzoyl)-phosphineoxide (TPO), 2-Hydroxy-2-methyl-1-phenyl-1-propanone (1173), 2-Methyl-1-[4-(methylthio)phenyl]-2-(4-morpholinyl)-1-propanone Phosphine oxide, Phenyl bis(2,4,6-trimethyl benzoyl, 2-Benzyl-2-(dimethylamino)-1-[4-(4-morpholinyl)phenyl]-1-butanone). The photoinitiator is contained in an amount of 0.5 to 10% by weight based on the total weight of the photocurable material formulation; preferably, the photoinitiator is contained in an amount of 0.1 to 4% by weight based on the total weight of the photocurable material formulation; more preferably, the photo initiator is 1 to 3% by weight based on the total weight of the photocurable material.

The photocurable material formulation may further comprise an additive selected from the group consisting of a light stabilizer, a hardener, a leveling agent and a defoamer. After the additive is added to the photocurable material, the photocurable material can stabilize the color of the light after the illumination, rapidly solidify and smooth the surface, and remove bubbles in the material. The content of the additive is up to 30% by weight based on the total weight of the photocurable material formulation; preferably, the content of the additive is 1-20% by weight based on the total weight of the photocurable material formulation.

The pigment, dye or photochromic material comprises from accounts for 0 to 12% by weight of the mixed formulation composition, and the pigment, dye or photochromic material is selected from the group consisting of organic pigments, inorganic dyes, titanium dioxide or carbon black. The photochromic material features a colorless or extremely light coloration when exposed to no light and produces significant color development upon illumination. The photochromic material is selected from the group consisting of fulgides, Schiff bases, phenoxy hydrazines, dihydropyrroles, naphthopyrans, benzopyrans, spiropyrans or spirooxazines. Preferably, the photochromic material is selected from the group consisting of benzopyran and spiropyran, which can have better solubility in the prepared acrylic series oligomers and acrylic series monomers of the present invention for photochromic effect. Preferably, the pigment, dye or photochromic material is: (i) titanium dioxide, in an amount of from 0.05 to 12% by weight of the hybrid formulation composition, (ii) carbon black, of the hybrid formulation composition an amount of 0.05 to 10% by weight, (iii) an organic ultraviolet light absorber such as hydroxybenzophenone, hydroxyphenylbenzotriazole, oxalic aniline, benzophenone, hydroxyphenyl triazine and/or a benzotriazole ultraviolet light absorber, in an amount of 0.001 to 2% by weight of the hybrid formulation composition, and/or (iv) a combination of benzopyran and spiropyran, which constitutes the hybrid formulation composition an amount of 0.05 to 10% by weight.

The filler accounts for 0 to 40% by weight of the hybrid formulation composition. The filler is selected from the group consisting of inorganic ore, calcium carbonate, cerium oxide, aluminum hydroxide, aluminum trihydrate, cerium oxide, halogen-containing or non-halogen fire-retardant material. The filler improves tear resistance and fire-retardant function.

In the presence of a suitable catalyst (usually tin complex), it promotes the reaction of isocyanate with a poly hydrocarbyl group (containing an OH-terminated polyester, a polyether or an acrylic polyol) to form a urethane, the network structure of the polymer. Preferably, the catalyst in the amount of 0 to 1% by weight of the mixed formulation composition, and the catalyst is selected from the group consisting of amine catalysts and metal catalysts.

The hybrid formulation composition may further comprise a reactive diluent for diluting the concentration and fluidity of the hybrid formulation composition. The hybrid formulation composition may further comprise a secondary alcohol; more preferably secondary diol to extend the pot life of the hybrid formulation composition.

The hybrid formulation composition 120 for 3D additive manufacturing has rubber-like properties, which can increase the toughness, resilience and tear resistance of the structural material after curing, and can be used for shoe materials, toys, biomedical equipment, and wearable articles.

Figure 2:
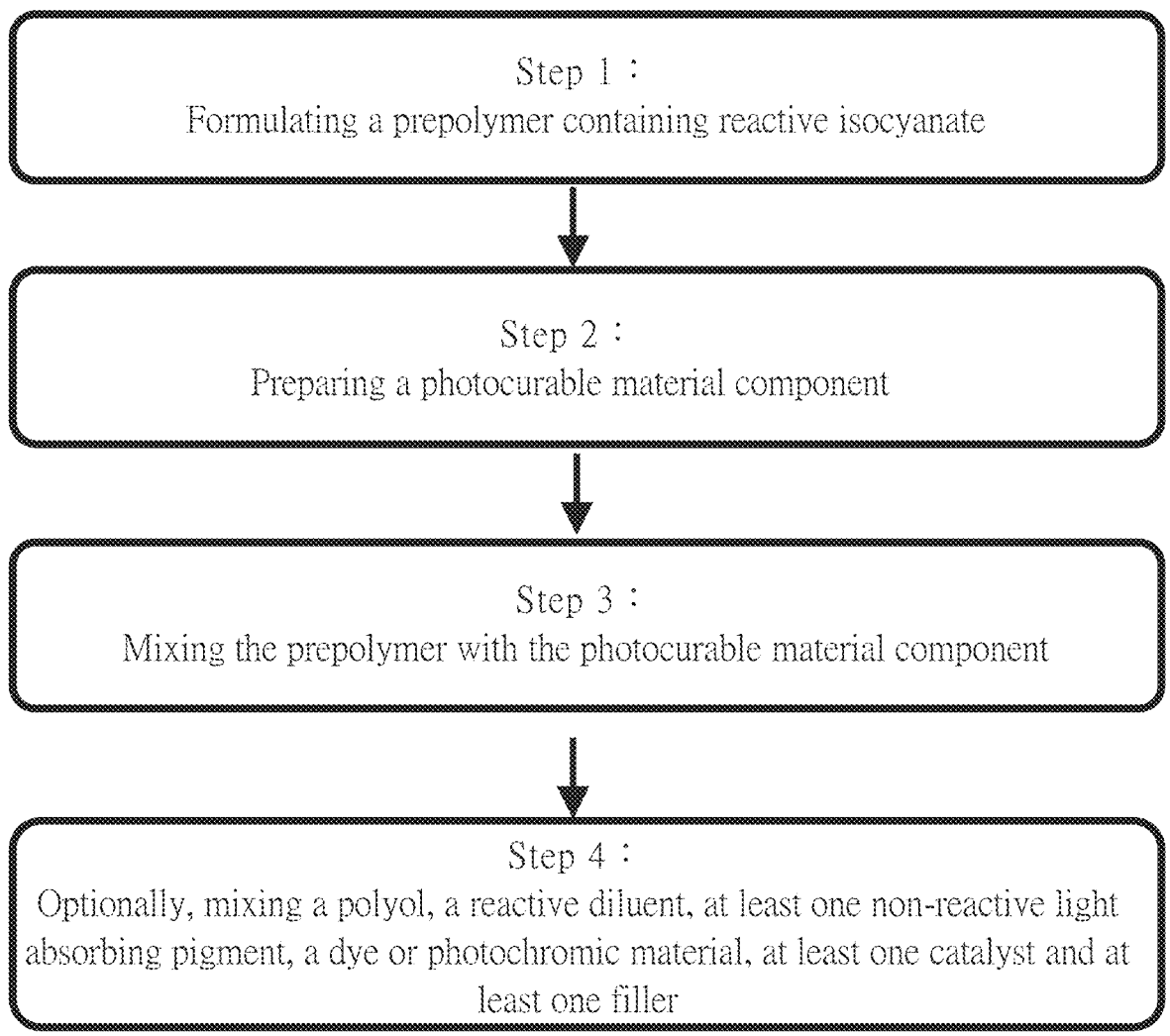
FIG. 2 is a schematic view showing a first implementation flow of a method for preparing a hybrid formulation composition for 3D additive manufacturing according to the present invention.

Referring to FIG. 2 together with FIG. 1, a first embodiment flow chart of a method for preparing a hybrid formulation composition for manufacturing 3D printed parts according to the present invention will be described. The hybrid formulation composition for producing a 3D printed parts is similar to the foregoing and will not be described herein. The mixed formulation composition is used to prepare a 3D structure comprising polyurethane, polyurea, acrylic or copolymer thereof. The process method includes the following steps Step 1: Prepare a prepolymer containing reactive isocyanate;

Step 2: Prepare a photocurable material formulation;

Step 3: Mixing the prepolymer with the photocurable material formulation;

Step 4: Optionally, mixing a polyol, a reactive diluent, at least one non-reactive light absorbing pigment, a dye or a photochromic material, at least one catalyst and at least one filler;

The photocurable material formulation accounts for 30 to 70% by weight of the hybrid formulation composition.

The prepolymer and the polyol account for 30 to 70% by weight of the hybrid formulation composition. The prepolymer comprises a polyisocyanate oligomer produced by reacting at least one isocyanate with at least one polyol, and the ratio of the isocyanate to the polyol (NCO/OH) is greater than 1, and the isocyanate is retained in the prepolymer to 2% to 20% (% NCO) content, the isocyanate (NCO) is not blocked. The prepolymer and the polyol prefers 30 to 70% by weight of the hybrid formulation composition. The weight ratio of prepolymer:polyol is 1:1, 2:1, 3:1, 4:1 or 5:1.

Figure 3:
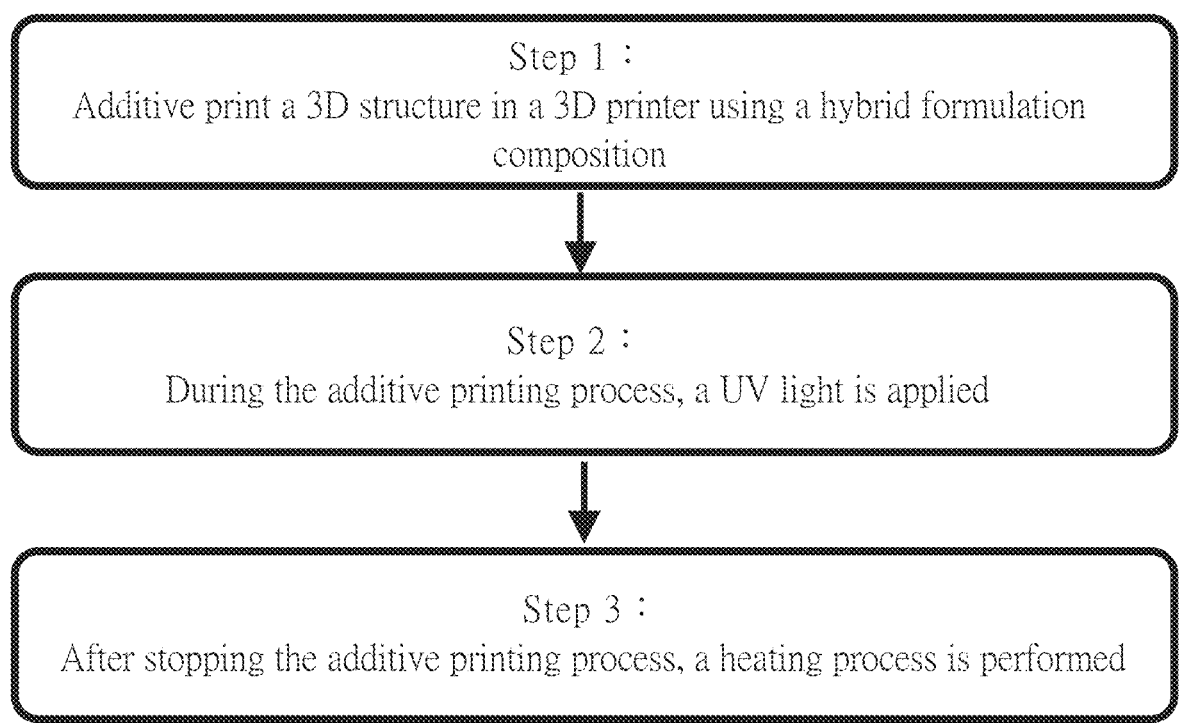
FIG. 3 is a schematic view showing a second implementation flow of a method for preparing a hybrid formulation composition for 3D additive manufacturing according to the present invention.

Referring to FIG. 3 together with FIG. 1, a second embodiment flow chart of a method for preparing a hybrid formulation composition for 3D additive manufacturing according to the present invention will be described. The hybrid formulation composition for producing a 3D printed parts is similar to the foregoing and will not be described herein. The process method of the 3D structure. The process method includes the following steps Step 1: Print a 3D structure layer by layer on a 3D printer using a hybrid formulation composition;

Step 2: During the layered printing process, an ultraviolet (UV) light is applied;

Step 3: After stopping the layered printing process, perform a heating process;

Wherein the hybrid formulation composition mainly comprises:

A prepolymer;

A photocurable material formulation, accounted for 30 to 70% by weight of the hybrid formulation composition;

a polyol;

optionally, at least one non-reactive light absorbing pigment, dye or photochromic material;

optionally, at least one catalyst; and optionally, at least one filler;

wherein the prepolymer and the polyol, accounted for 30 to 70% by weight of the hybrid formulation composition; and wherein the prepolymer comprises a polyisocyanate oligomer produced by reacting at least one isocyanate (NCO) with at least one polyol, and the ratio of the isocyanate to the polyol (NCO/OH) is greater than one.

In the step 2: UV light irradiation step, a UV light is irradiated onto the mixed composition 120 to cure the mixed composition 120 over the 3D structure 110. An important feature of the present invention is that the mixed composition 120 is cured by irradiation of a UV light. The UV light has a wavelength between 240 nm and 450 nm. The irradiation intensity of the UV light is between 0.1 J/cm2 and 1 J/cm2. The irradiation time of the UV light is between 0.5 seconds and 90 seconds.

It should be noted that the mixed formulation composition for 3D additive manufacturing is a fluid-like substance which can be appropriately heated when various materials are dissolved.

In the step 3: heating process, the heating temperature is between 30° C. and 200° C.; preferably, the heating temperature is between 80° C. and 150° C. Moreover, the heating process is performed between 30 minutes and 16 hours; preferably, the heating process is between 30 minutes and 1 hour. The 3D structural finished product made of the hybrid formulation composition has rubber-like properties, whereby the heating process can increase the toughness, resilience and tear resistance of the cured 3D structural material.

In the present invention, the ratio of the isocyanate to the polyol (NCO/OH) of the prepolymer of the hybrid formulation composition for the 3D additive manufacturing—is greater than 1 i.e. isocyanates are not blocked. The invention has the following advantages 1. The toughness, resilience and tear resistance of the hybrid formulation composition for 3D additive manufacturing can be adjusted according to requirements, and it is free of volatile substances, and is an environmentally friendly material.
2. The hybrid formulation composition for 3D additive manufacturing has rubber-like properties, which can increase the toughness, resilience and tear resistance of the structural material after curing, and can be used for shoe materials, toys, biomedical equipment, and wearable articles.
3. The process of the hybrid formulation composition for 3D additive manufacturing requires only 2-3 seconds of photocuring, low heat curing temperature, short process time, saving process energy and increasing productivity.

While the present invention has been described in its preferred embodiments, it is not intended to limit the scope of the invention, and various modifications and changes can be made without departing from the spirit and scope of the invention. As explained above, various modifications and variations can be made without departing from the spirit of the invention. Therefore, the scope of the invention is defined by the scope of the appended claims.

What is claimed is:

1. A mixed (hybrid) formulation composition for 3D additive manufacturing which mainly comprises:
    a prepolymer of the formula T-R-T, R is a polymer of a polyol, each T is a terminal group of R, and T is a reactive isocyanate (NCO), wherein R of the prepolymer comprises reactive end groups;
    a photocurable material formulation, accounted for 30 to 70% by weight of the hybrid formulation composition; and
    a polyol;
    wherein the prepolymer and the polyol, accounted for 30 to 70% by weight of the hybrid formulation composition.

2. The hybrid formulation composition according to claim 1, wherein the photocurable composition formulation comprises at least: an acrylic series oligomer, acrylic series monomers, and at least one photoinitiator, and
    wherein the acrylic series oligomer is selected from one of the following combinations: epoxy acrylate (EA), polyurethane acrylate (PUA), polyester acrylate (PEA), epoxy acrylate resin, unsaturated polyester acrylate, polyether acrylate, and acrylated polyacrylic resin.

3. The hybrid formulation composition of claim 1, wherein the photocurable composition formulation comprises at least: an acrylic series oligomer, acrylic series monomers, and at least one photoinitiator, wherein the acrylic series monomer is selected from one of the following combinations: (meth) acrylate group, vinyl acrylate group, acrylated vinyl ether group, epoxy acrylate group.

4. The mixed (hybrid) formulation composition for 3D additive manufacturing of claim 1 further comprising:
    at least one non-reactive light absorbing pigment, dye or photochromic material.

* * * * *